United States Patent
Fan et al.

(10) Patent No.: US 8,288,001 B1
(45) Date of Patent: Oct. 16, 2012

(54) METHOD OF MAKING MONODISPERSE NANOPARTICLES

(75) Inventors: Hongyou Fan, Albuquerque, NM (US); Zaicheng Sun, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 348 days.

(21) Appl. No.: 12/706,003

(22) Filed: Feb. 16, 2010

(51) Int. Cl.
*B32B 5/02* (2006.01)
*B32B 5/16* (2006.01)

(52) U.S. Cl. ..... 428/402; 428/403; 428/404; 427/213.3; 427/212

(58) Field of Classification Search .................. 428/402, 428/403, 404; 427/212, 213.3
See application file for complete search history.

(56) References Cited

U.S. PATENT DOCUMENTS

| | | | |
|---|---|---|---|
| 6,383,500 | B1 | 5/2002 | Wooley et al. |
| 6,573,313 | B2 | 6/2003 | Li et al. |
| 6,881,490 | B2 | 4/2005 | Kambe et al. |
| 7,563,457 | B2 | 7/2009 | Cha et al. |
| 2006/0084722 | A1 | 4/2006 | Bohm et al. |

OTHER PUBLICATIONS

Sun et al., Cooperative Self-Assembly-Assisted Formation of Monodispersed Optically Active Spherical and Anisotropic Nanoparticles, Chem. Eur. J 2009 15 pp. 11128-11333.*
Sidorenko, Alexander,Ordered Reactive Nanomembranes/Nanotemplates from Thin Films of Block Copolymer Supramolecular Assembly, J. Am. Chem. Soc. 2003. 125,12211-2216.
Sun, Zaicheng, Cooperative Self-Assembly-Assisted Formation of Monodisperse Optically Active Spherical and Anisotropic Nanoparticles, CHem. Dur. J. 2009, 15, 11128-11133.
Sun, Zaicheng, Hydrogen-Bonding-Assisted Self-Assembly: Monodisperse Hollow Nanoparticles Made Easy, 13594—J. Am. Chem. Soc. 2009, 131, 13594-13595.

* cited by examiner

*Primary Examiner* — Robert D. Harlan
(74) *Attorney, Agent, or Firm* — Elmer A. Klavetter; Kevin W. Bieg (57) ABSTRACT

A method of making particles of either spherical or cylindrical geometry with a characteristic diameter less than 50 nanometers by mixing at least one structure directing agent dissolved in a solvent with at least one amphiphilic block copolymer dissolved in a solvent to make a solution containing particles, where the particles can be subsequently separated and dispersed in a solvent of choice.

20 Claims, 5 Drawing Sheets

METHOD OF MAKING MONODISPERSE NANOPARTICLES

This invention was made with Government support under Contract No. DE-AC04-94AL85000 awarded by the Department of Energy. The Government has certain rights in the invention.

BACKGROUND OF THE INVENTION

The present invention relates to a method of making polymer particles and, more particularly, to a self-assembly method of making monodisperse particles. Widespread use of polymer particles in microelectronic, sensor device, precision and optical coating, and semiconductor industries, as well as templates for nanostructured materials requires polymers with uniform feature size less than 50-nm, controlled shape, and precise engineering of functionalities. Polymer nanoparticles are predominantly prepared by wet synthetic routes, such as micro-emulsion or mini-emulsion polymerization methods, in which large amount of surfactants are needed to form an emulsion that confines polymerization and formation of particles. Tedious purification processing, such as dialysis, is therefore needed to remove extra surfactants and by-products in side reactions from the final particles, which often leads to particle stability problems (for example, aggregation) and also limits flexibility in tuning particle functionality. Macromolecular self-assembly is another method to prepare polymer micelles of less than 50-nm. The stability issues associated with temperature- or solvent-sensitivity of micelle size and shape, lengthy purification process (such as dialysis), as well as complicated chemical synthesis makes them difficult for scalable applications.

DETAILED DESCRIPTION OF THE INVENTION

In the present invention, a method is provided in which spontaneous self-assembly is employed to synthesize monodisperse polymer nanoparticles with controlled size and shape, and with tunable functionality. The nanoparticles of the present invention are particles with an average characteristic dimension (such as the characteristic diameter) of less than approximately 50 nm. If the particle is spherical, the diameter is less than approximately 50 nm; if the particle is cylindrical or rod-like, then the diameter is less than approximately 50 nm with a length that can be greater than 50 nm. Monodisperse is taken to mean that this characteristic dimension has a standard deviation of less than approximately 15% around an average value.

Cooperative interactions such as hydrogen bonding, π-π stacking between self-assembled macromolecules and structure directing agents (SDAs) causes phase separation that drives the formation of spherical and anisotropic solid polymer nanoparticles with SDAs residing in the particle core surrounded by the polymers. These nanoparticles exhibit tunable optical properties upon choice of SDAs. Removal of SDAs leads to the formation of monodisperse hollow polymer nanoparticles that can template to synthesize varied hybrid nanoparticles. The method of the present invention does not require complicated synthetic chemistry, stabilizing surfactants, or annealing procedure (for examples, temperature or solvent annealing), making scalable synthesis practicable.

Figure 1:
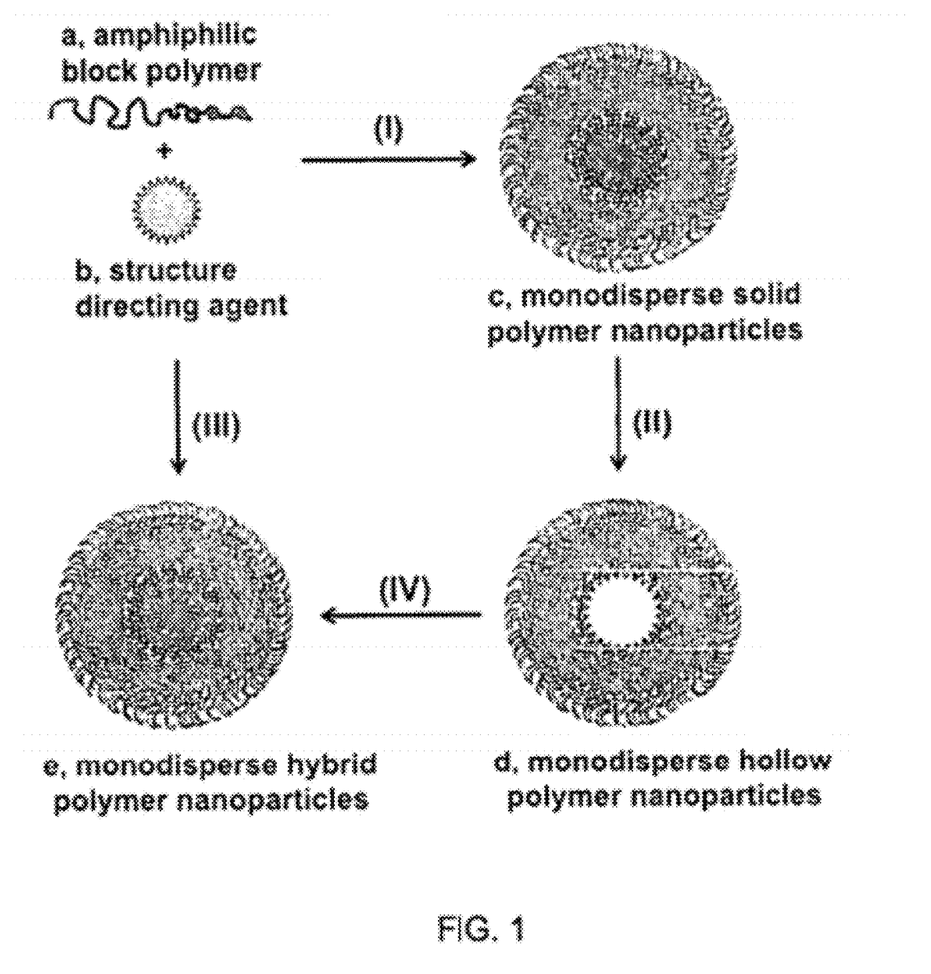
FIG. 1 illustrates one embodiment of the self-assembly and nanoparticle preparation process.

FIG. 1 illustrates various embodiments of the self-assembly and nanoparticle preparation process. In FIG. 1, one or more structure directing agents (SDAs) dissolved in a polar organic solvent are added to one or more amphiphilic block copolymers, which are also dissolved in a polar organic solvent. In one embodiment, depicted as process (I) in FIG. 1, monodisperse solid polymer nanoparticles are formed. Subsequently, the SDAs can be removed to form monodisperse hollow polymer nanoparticles, as depicted in process (II). These hollow polymer nanoparticles can be combined (see process (IV)) with metal-containing compounds to form monodisperse hybrid polymer nanoparticles, which can also be obtained by have certain metal-containing compounds serve as the SDA to combine with the amphiphilic block copolymer (see process (III)) to directly produce monodisperse hybrid polymer nanoparticles. In one embodiment, the nanoparticles can be prepared at temperatures less than approximately 80° C. Typically, the nanoparticles are prepared at temperatures ranging from approximately 50° C.-80° C. but can also be prepared at room temperature. After heating, sometimes for several hours, nanoparticles are formed in solution and can be separated using standard methods, such as centrifugation. The resulting nanoparticles can be dispersed into a solvent for subsequent use and processing.

Amphiphilic block copolymers are compounds having both a hydrophilic block copolymer and a hydrophobic block copolymer. The block copolymers are composed of two or more monomers which are segregated into blocks along the polymer chain, having segments of hydrophilic and hydrophobic (or lipophilic) character. Amphiphilic block copolymers can include one or more hydrophobic block parts and one or more hydrophilic block parts. Examples of hydrophobic blocks include, but are not limited to, poly(alkyl ethers), poly(ε-caprolactone), polystyrene, poly(methyl methacrylate), polyactides. Examples of hydrophilic blocks include, but are not limited to, polyethylene oxide), and poly(vinyl alcohol). Examples of amphiphilic block copolymers that can be used in the present invention include polystyrene-b-polyvinylpyridine (PS-PVP), poly(isoprene)-poly(vinyl pyridine), poly(vinyl pyridine)-poly(styrene)-poly(vinyl pyridine), poly(styrene)-poly(vinyl pyridine)-poly(styrene), poly(styrene-poly(acrylic acid), poly(styrene)-poly(butadiene)-poly(vinyl pyridine), poly(styrene-poly(methacrylic acid), poly(styrene)-poly(ethylene oxide), poly(butadiene)-poly(acrylic acid), poly(butadiene)-poly(ethylene oxide), poly(vinyl pyridine)-poly(butadiene)-poly(vinyl pyridine), poly(ethylene)-polyethylene oxide), and poly(styrene)-poly(vinyl pyridine)-poly(ethylene oxide). These block copolymers can generally be dissolved in solvents such as dioxane, toluene, tetrahydrofuran and dimethylfuran.

SDAs are molecules that have hydrophilic groups that are capable of forming interactions, such as hydrogen bonds with hydrophilic chains (such as with polyvinylpyridine (PVP)); in the method of the present invention, SDAs are used that have the hydrophilic groups —OH, —COOH, and —NH$_2$. Examples of SDAs that can be used in the present invention include 8,13-bis(1-hydroxyethyl)-3,7,12,17-tetramethyl-21H,23H-porphine-2,18-dipropionic acid (HPDC), 5,10,15,20-tetrakis(4-hydroxyphenyl)-21H,23H-porphine (THP), tetra(4-carboxyphenyl)porphine (TCP), 2-(4'-hydroxybenzeneazo)benzoic acid (HBBA), hydrophilic dye molecules, such as fluorescein, small protein molecules, small peptide molecules, inorganic salts (for example, $M(NO_3)_3$, where M=Eu, Pr, Tb, Er, Tm, Ce, Fe, and $ZnNO_3$), and hydrophilic nanoparticles (for example, hydroxylated CdSe nanoparticles).

In addition to directing polymer nanoparticle structures, optically active SDAs can be used as functional elements in the synthesis of composite polymer nanoparticles. Preferential hydrogen bonding between amphiphilic block copolymers and SDAs causes phase separation that drives the formation of both spherical and anisotropic solid polymer nanoparticles. SDAs reside in the particle core surrounded by the polymers. For example, 8,13-Bis(1-hydroxyethyl)-3,7,12,17-tetramethyl-21H,23H-porphine-2,18-dipropionic acid (HPDC) has both —OH and —COOH groups available to form hydrogen bonds with PVP chains resulting in monodisperse solid particles. According to previous FTIR studies, formation of hydrogen bonds between (—N=) of PVP and hydroxyl groups causes changes in the electronic distributions of the pyridine ring resulting in red-shifts for the stretching modes of the pyridine ring. Obtained FTIR spectra show evident formation of hydrogen bonds. Additionally, UV-vis spectroscopy provides strong evidence of J-aggregation of HPDC through π-π stacking and/or hydrogen bonds between SDAs. In addition to HDPC, other SDAs that have been used include 5,10,15,20-Tetrakis(4-hydroxyphenyl)-21H,23H-porphine (THP), Tetra(4-carboxyphenyl)porphine (TCP), 2-(4'-hydroxybenzeneazo)benzoic acid (HBBA), and fluorescein. Alcohols are good solvents for PVP chains and non-solvent for PS chains. To synthesize hollow nanoparticles, alcohol soluble SDAs were used. The preferential solvation of the PVP chains with alcohols breaks the hydrogen bonds between PVP chains and SDAs, which also dissolves and selectively removes SDAs to form hollow nanoparticles.

Figure 2:
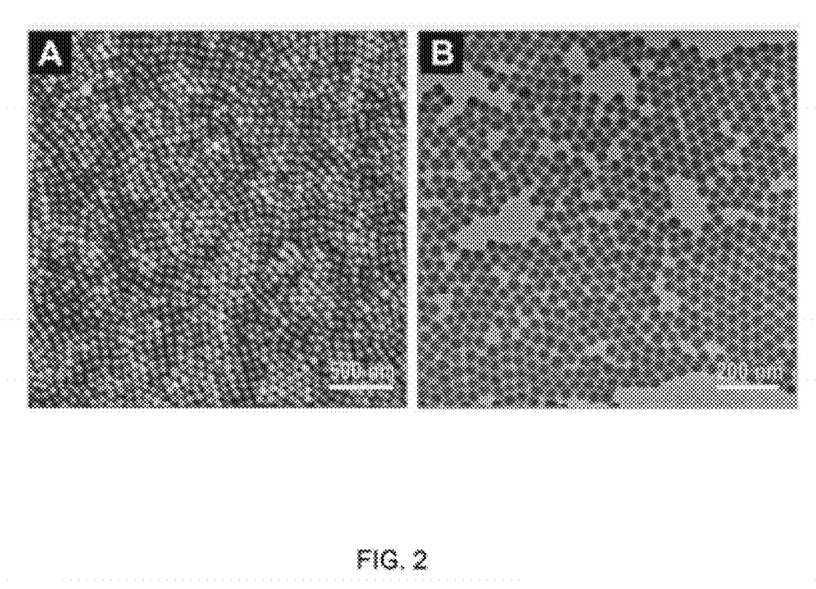
FIG. 2 shows a scanning electron microscopy (SEM) image (A) and a tunneling electron microscopy (TEM) image (B) of spherical monodisperse nanoparticles prepared using 2 wt % PS-PVP and 2 wt % HPDC.
Figure 3:
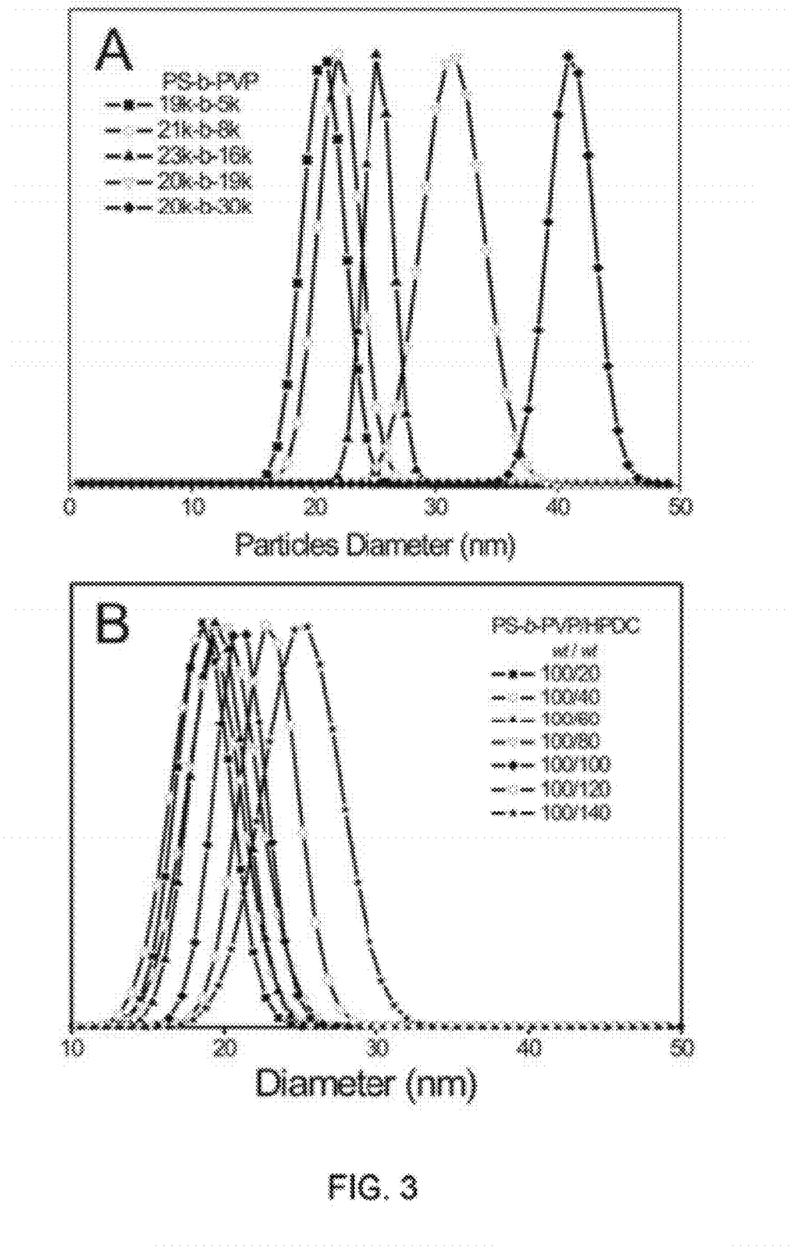
FIG. 3 demonstrates the capability to control the nanoparticle size within the spherical morphology regime.

Final polymer nanoparticles are monodisperse without requiring further size selection or purification procedures such as filtration or dialysis. The nanoparticles are very stable and can be re-dispersed in common solvents, such as toluene, dioxane, and chloroform to form a homogeneous solution. The monodispersity has been confirmed by electron microscopy. FIG. 2 shows a scanning electron microscopy (SEM) image of spherical monodisperse nanoparticles prepared using 2 wt % PS-PVP and 2 wt % HPDC. The nanoparticles have an average diameter $D_p$=41-nm with a narrow size distribution (standard deviation a of approximately 7%). The transmission electron microscopy (TEM) images obtained verified that the nanoparticles were solid by showing uniform electron contrast throughout each nanoparticle. Formation of hexagonally ordered nanoparticle arrays, as expected for individual monosized nanoparticles, further confirms the monodispersity. Tuning of the nanoparticle size was achieved using a range of conditions, such as PS and/or PVP chain size and added amount of SDAs. When PS-PVP is the amphiphilic block copolymer, testing has shown that a minimum molecular weight of the PVP copolymer is approximately 10,000 in the presence of an SDA. FIG. 3 shows that the nanoparticle size can be controlled from 15-nm to 45-nm within the spherical morphology regime by changing the size of the chains of the hydrophilic and hydrophobic block copolymers (see FIG. 3A) or by changing the relative amounts of the hydrophilic and hydrophobic block copolymers (see FIG. 3B), where in this embodiment the block copolymers are PS and PVP.

Through solvent evaporation, continuous films of ordered polymer nanoparticles can be formed on a wide range of substrates, including silicon wafer, glass, and carbon film via processes such as cast-, spin-, and dip-coating.

Figure 4:
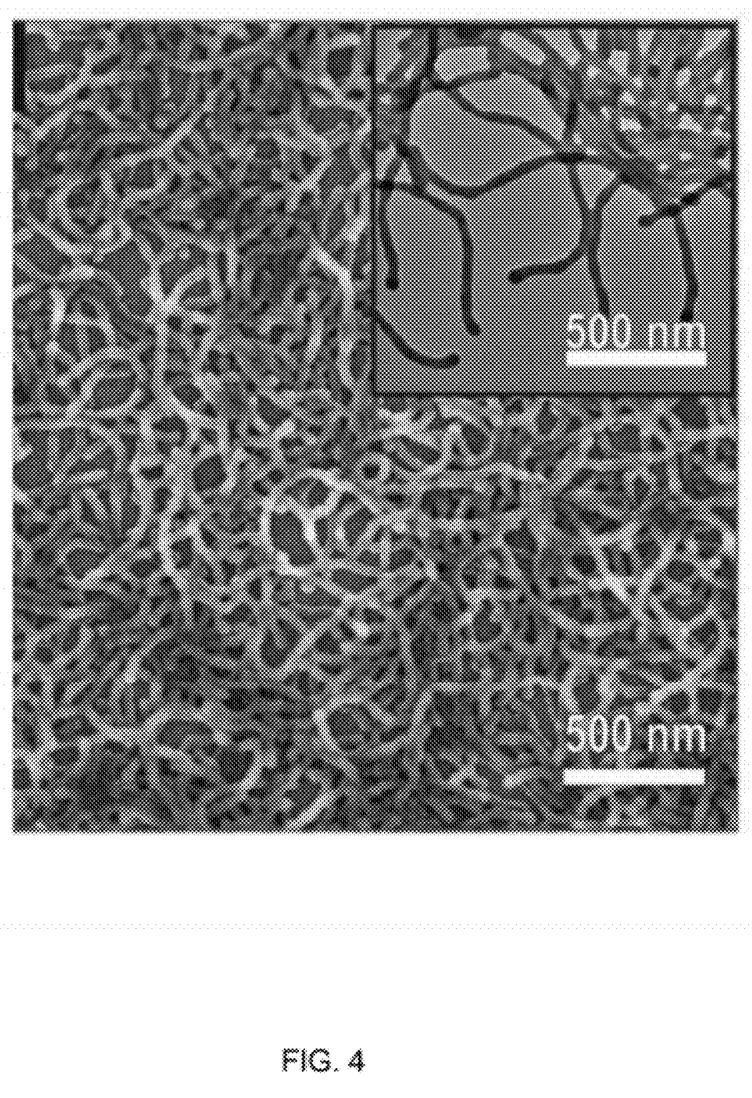
FIG. 4 shows an SEM image of typical polymer nanowires.

In addition to spherical nanoparticles, in other embodiments, anisotropic structures including cylindrical nanowires and rods were prepared. FIG. 4 shows an SEM image of typical polymer nanowires. The diameter of the one-dimensional wire is 40-nm. The length is in the range of 1-5-μm. TEM imaging revealed the nanowire to be solid. Based on the composition for formation of cylindrical nanowires, branched rods were found to be obtained by further increasing HDPC or PVP chain size. SEM images show branched rods with random Y-junctions along the cylinder which has been observed in other polymer systems. Besides PS-PVP, other amphiphilic block copolymers used included polystyrene-b-polyethylene oxide (PS-PEO) and polystyrene-b-polyacrylic acid (PS-PAA) to synthesize polymer nanoparticles and cylindrical nanowires.

Through detailed investigations by SEM and TEM, nanoparticle morphology evolution and dependence on factors such as SDA concentration and PVP size, can be explained. By keeping PS chain size constant, the morphology progresses from continuous film to spherical particle, and on to cylindrical nanowire or rod. Each regime is separated by mixed morphologies with increasing PVP chain size. PS-PVP tends to form continuous films when $M_{w-PVP}$ is less than approximately 20,000 with no or relatively less SDAs, in agreement with previous reports. Increasing PVP size and amount of SDAs dramatically leads to spherical nanoparticles with a wide range of compositions. In general, the hydrophilic block copolymer should have a molecular weight sufficiently large such that micelle formation and free separation in solution occurs. For larger PVP chains ($M_{w-PVP}$>40,000), cylindrical nanowires and rods (that is, nanoparticles with a cylindrical geometry) are dominated. It can be concluded that hydrogen bonding leads to formation of PS-PVP[SDA] macromolecules. Hydrophilic SDAs (e.g., —OH, —COOH, etc) increase PVP[SDA] chain polarity which facilitate phase separation of PS-PVP[SDA] macromolecules and the formation of polymer nanoparticles. Meanwhile, interactions such as π-π packing and/or hydrogen bonds between SDAs can provide the essential driving force to pull SDA associated PVP chains together to form the nanoparticle core surrounded by PS. When the PVP chain is relatively small ($M_{w-PVP}$ below 30,000), spherical particles are favorable. With increasing PVP chain size and/or SDAs, the PVP[SDA] fraction increases, facilitating formation of more-favorable, low-curvature-morphology cylindrical wires or rods. In contrast with conventional macromolecule micelles that are essentially solvent- and/or temperature-dependent, in the self-assembly system of the present invention, π-π packing and/or hydrogen bonds provide additional driving forces that enhance particle stability. This is the reason that nanoparticles can be re-dispersed in different solvents without changing their shape and size. In addition, the thermal stability of the nanoparticles is also improved. Results indicate that spherical nanoparticles retain their shape and size after several hours of heating at 180° C., much higher than the glass transition temperatures of PS-PVP with currently used molecular weights.

Figure 5:
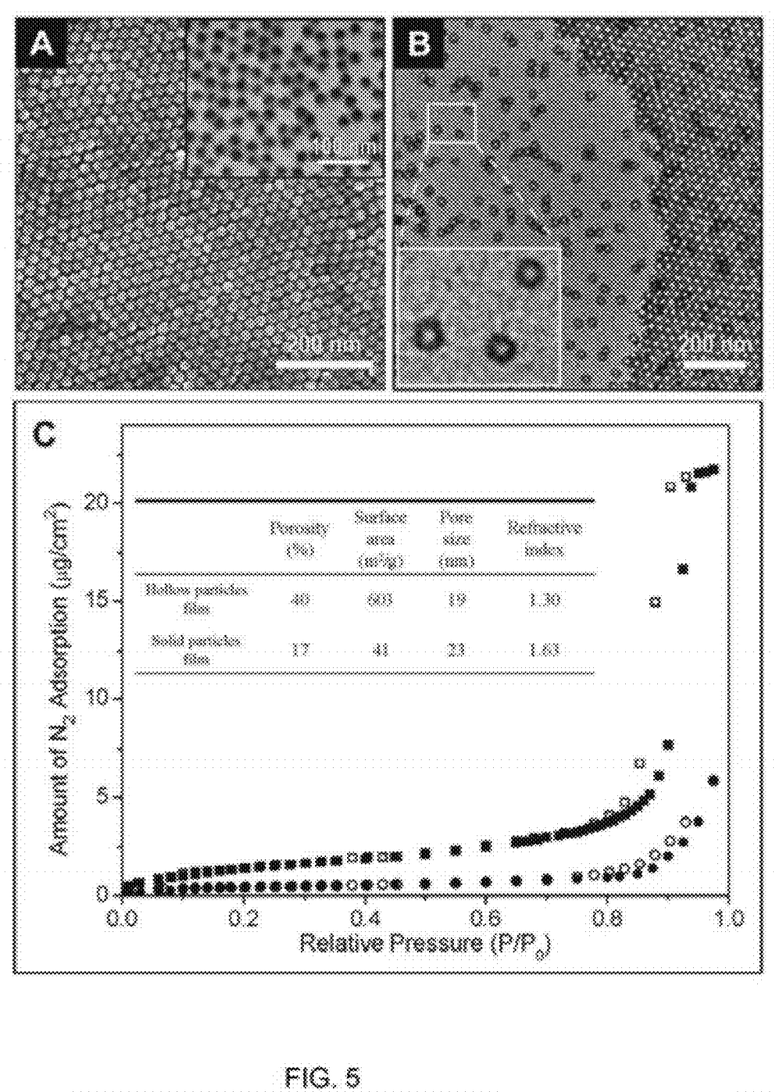
FIG. 5 shows SEM and TEM images of polymer nanoparticles prepared using 2 wt % PS-PVP and 2 wt % HBBA before and after removal of HBBA.

To synthesize hollow nanoparticles, alcohol-soluble SDAs, such as HBBA, were used. The SEM image in FIG. 5A and TEM images in FIG. 5B show the polymer nanoparticles prepared using 2 wt % PS-PVP and 2 wt % HBBA before and after removal of HBBA. Before removal of SDAs, the nanoparticles are monodisperse spherical solid particles with an average diameter of $D_p$=35-nm. After removal of SDAs by alcohol wash, the TEM image shows evident electron contrast between the core and shell of the particle confirming the formation of hollow particles. The TEM image also reveals that the hollow nanoparticles remain spherical in shape after removal of SDAs, demonstrating their stability. The formation of hollow nanoparticles further confirms that the SDA associated PVP chains reside at the nanoparticle core surrounded by PS. The hollow particles have a shell thickness $D_s$=11-nm and diameter of hollow cavity $D_h$=20-nm. By careful control of molar ratio of HBBA to PVP, it was determined a HBBA:PVP molar ratio threshold of approximately 1.5, above which the diameter $D_h$ does not increase. The extra HBBAs crystallized in solutions. Below the threshold, one can control the diameter $D_h$ of the hollow cavity from several nanometers up to tens of nanometers by gradually increasing the size of the polymer and/or HBBA amounts. The hollow nature and the accessibility of the cavity are further verified by nitrogen sorption measurements using a surface acoustic wave technique. FIG. 5C compares nitrogen sorption isotherms of solid and hollow nanoparticle films at 77K. Both films follow type IV sorption isotherms. Solid nanoparticle films have a dramatic nitrogen uptake starting at $P/P_0$~0.8 with small hysteresis, suggesting the existence of large mesopores. This is due to the gaps between neighboring nanoparticles. After removal of HBBAs, the hollow nanoparticle film exhibits an H1 type hysteresis loop, with almost vertical steps on the ascending and descending curve starting at $P/P_0$~0.8, which is characteristic of a mesoporous material with a narrow pore size distribution. The measured surface areas from both solid and hollow nanoparticle films demonstrate the accessibility of the hollow cavities and mesoporosity between neighboring nanoparticles. By subtracting the porosity of solid particle film, the porosity resulting from the hollow cavities is 23%. Visible ellipsometric data for this film before and after removal of HBBA were fitted with refractive indices (n) of 1.63 and 1.30 at 550-nm, respectively. The decrease of n is due to the presence of the hollow cavity. By controlling the amount of added SDAs, the index of refraction was tuned from that of the solid PS/PVP (1.64) to 1.20 at 550-nm.

The robustness of the self-assembly process of the present invention enables the preparation a variety of spherical and cylindrical composite nanoparticles while retaining the respective structure and function of SDAs in the nanoparticle core. In one embodiment, hybrid polymer nanoparticles containing CdSe/ZnS nanocrystals were made using the process (III) depicted in FIG. 1 wherein the amphiphilic block copolymer was mixed with a metal-containing compound containing hydroxyl group-functionalized CdSe/ZnS. The hybrid nanoparticles produced with an average diameter of 20 nm exhibited optical properties with an optical absorption over 550-600 nm and an emission between 500-600 nm resulting from CdSe/ZnS nanocrystals inside the nanoparticles. Depending on the choice of SDAs, the optical properties of nanoparticles can be readily tuned without requiring complicated chemistry. By using metal-compound precursors as the SDA (for example $H_2PdCl_4$ and $HAuCl_4$ or other compounds containing metals such as Pt and Ag), hybrid spherical nanoparticles and cylindrical rods can be synthesized containing uniform Pd, Au nanocrystals, or incorporating other inorganic elements such as inorganic salts (for example, $M(NO_3)_3$, where M=Eu, Pr, Tb, Er, Tm, Ce, Fe, and $ZnNO_3$). Removal of SDAs results in empty space and available nitrogen (—N═) of PVP chains which provide well-defined nanocavity and surface reactive sites for further introduction of functional elements. In one embodiment, hybrid nanoparticles containing $TiO_2$ nanoparticles by introduction of titanium (IV) tert-butoxide (TBO) were prepared. Hydrolysis and condensation of TBO produced hydroxylated oligomers or nanoclusters that are associated with PVP through hydrogen bonding between the hydroxyl groups and nitrogen (—N═) of the PVP chains. Further nucleation and growth of $TiO_2$ nanoparticle are thus confined with the hollow cavities. TEM images showed that the final hybrid nanoparticles had an average diameter of 20-nm. The hybrid nanoparticles prepared using larger PVP chain show more $TiO_2$ nanoparticles loading than those prepared using smaller PVP chain. This is because a larger PVP chain provides more reactive sites (—N═) for nucleation and growth than a smaller PVP chain. Besides $TiO_2$, the method of the present invention has been used to synthesize hybrid nanoparticles containing other metal oxide nanoparticles such as silica.

The self-assembly method of the present invention is a facile and general process to directly synthesize monodisperse polymer nanoparticles with controlled sizes and shapes. It effectively enhances nanoparticle stability and enables formation of large areas of uniform films of ordered nanoparticle arrays, providing practical utilization of these nanoparticles in membranes, nanolithography, and optical coatings, as well as templating viable nanostructured materials. Its robustness enables one to fabricate varied composite polymer nanoparticles. The uniform hollow nanocavity with surface reactivity provides direct application in separation, catalysis and sensors, and as nanoreactors for the synthesis of complex organic, inorganic, and biospecies assemblies in general.

EXAMPLES

General Synthesis of Monodisperse Polymer Nanoparticles

In general, 2 ml of 2-4 wt % block copolymers in organic solvents such as dioxane, toluene, or mixture, etc. was added to 2 ml solutions containing varied amount of SDAs in same solvent. After stirring, the nanoparticles were collected by centrifuging. To test thermal stability, the coating solution was heated to 180° C. for up to 10 hours in an autoclave and then passively cooled to room temperature. The resulting nanoparticles were re-dispersed into common solvents like toluene, chloroform, dioxane, and tetrahydrofuran (THF). For transmission electron microscopy (TEM) and scanning electron microscopy (SEM) characterization, samples were prepared by drop-casting of a small amount of solutions on TEM grids or Si wafer. For films, specimens were prepared by dip- or spin-coated on substrates such as Si wafer, microscope glass, and carbon films, etc. In the case of synthesis of hollow polymer nanoparticles, HBBA was used as the SDA. Removal of HBBA was conducted using an alcohol (for example, methanol or ethanol) wash.

Characterization:

SEM images were taken using an Hitachi 5200 FEG microscope. TEM was performed on a JEOL 2010 with 200 kV acceleration voltage, equipped with a Gatan slow scan CCD camera. A surface acoustic wave (SAW) technique was used to characterize nitrogen sorption isotherms of hollow nanoparticle films.

Example 1

Synthesis of a General Spherical Solid Nanoparticles

A 2 ml dioxane containing 2 wt % $PS_{19.9k}$-$PVP_{29.4k}$ was added into a 2 ml dioxane solution containing 2 wt % 8,13-Bis(1-hydroxyethyl)-3,7,12,17-tetramethyl-21H,23H-porphine-2,18-dipropionic acid. After stirring overnight at elevated temperature (50-70° C.), the nanoparticles were collected by centrifuging. To test thermal stability, the coating solution was heated to 180° C. for up to 10 hours in an autoclave and then passively cooled to room temperature. The resulting nanoparticles (see FIG. 2) can be re-dispersed into common solvents like toluene, chloroform, dioxane, and THF.

Example 2

Synthesis of Hollow Nanoparticles

A 2 ml dioxane solution containing 2 wt % $PS_{19.9k}$-$PVP_{29.4k}$ was added into a 2 ml dioxane solution containing 2 wt % 2-(4'-hydroxybenzeneazo)benzoic acid (HBBA). After stirring for 3 hours at elevated temperature, the nanoparticles were collected by centrifuging. At this stage, the nanoparticles are solid. Due to the monodispersity, the nanoparticles form ordered hexagonal arrays on a substrate. After removal of HBBA by ethanol wash, the nanoparticle become hollow nanoparticles (see FIG. 5).

Example 3

Synthesis of Nanowires

A 2 ml dioxane solution containing 2 wt % $PS_{5.3k}$-$PVP_{58.0k}$-$PS_{5.3k}$ was added into a 2 ml dioxane solution containing 2 wt % 2-(4'-hydroxybenzeneazo)benzoic acid (HBBA). After stirring for 3 hours at elevated temperature, the nanoparticles were collected by centrifuging. The diameter of the one-dimensional wire is approximately 40-nm. The length is in the range of 1-5-µm. TEM imaging (FIG. 4) revealed the nanowire to be solid.

Example 4

Tuning Refractive Index

Tuning refractive index (or porosity) can be accomplished by tuning the amount of polymer and SDA. Table 1 shows the specific examples, wherein the method of forming the particles was similar to the method described in Example 2.

TABLE 1

| | Amount of polymer | Amount of SDA | Porosity (%) | Surface area ($m^2/g$) | Pore size (nm) | Refractive index |
|---|---|---|---|---|---|---|
| Hollow particle film 1 | 2 wt % $PS_{19.9k}$-$PVP_{29.4k}$ | 2 wt % HBBA | 40 | 603 | 19 | 1.3 |
| Hollow particle film 2 | 4 wt % $PS_{19.9k}$-$PVP_{29.4k}$ | 4 wt % HBBA | ~60 | 800 | 19 | 1.2 |
| Solid particle film | 2 wt % $PS_{19.9k}$-$PVP_{29.4k}$ | 2 wt % HBBA | 17 | 41 | 23 | 1.63 |

Example 5

Syntheses of Nanoparticle Containing Inorganic Elements

In one embodiment, 10 mg of $M(NO_3)_3 \cdot 5H_2O$ (M=Tb, Eu, or Tm) was dissolved into 1 ml of 1,4-dioxane. The above solution was added into 1 ml of 5% PS-PVP/1,4-dioxane solution ($Mw_{PS}$=20,000 g/mole, $Mw_{PVP}$=19,000, P.I.=1.09, respectively) and stirred overnight on a hotplate set at 70° C. The nanoparticles were collected by centrifugation at 100 k rpm for 1 hour. The nanoparticles can be redispersed into various polar solvents, such as toluene, 1,4-dioxane, tetrahydrofuran, and chloroform. TEM images showed that monodisperse particles were produced of an average diameter of between 38 and 44 nm.

The invention being thus described, it will be apparent to those skilled in the art that the same may be varied. Such variations are not to be regarded as a departure from the spirit and scope of the invention, and all such modifications are intended to be included within the scope of the following claims.

We claim:

1. A method of making particles, comprising mixing at least one structure directing agent dissolved in a first solvent with at least one amphiphilic block copolymer dissolved in a second solvent to make a solution containing particles with a characteristic diameter less than 50 nanometers.

2. The method of claim 1 wherein said particles are monodisperse with a standard deviation of less than 15% around said characteristic diameter.

3. The method of claim 1 wherein said mixing occurs at a temperature greater than 50° C.

4. The method of claim 1 wherein said mixing occurs at a temperature less than 80° C.

5. The method of claim 1 wherein said particles are separated and then dispersed into a third solvent.

6. The method of claim 1 wherein said amphiphilic block copolymer is selected from the group consisting of polystyrene-b-polyvinylpyridine (PS-PVP), poly(isoprene)-poly(vinyl pyridine), poly(vinyl pyridine)-poly(styrene)-poly(vinyl pyridine), poly(styrene)-polyvinyl pyridine)-poly(styrene), poly(styrene-poly(acrylic acid), poly(styrene)-poly(butadiene)-poly(vinyl pyridine), poly(styrene-poly(methacrylic acid), poly(styrene)-poly(ethylene oxide), poly(butadiene)-poly(acrylic acid), poly(butadiene)-poly(ethylene oxide), poly(vinyl pyridine)-poly(butadiene)-poly(vinyl pyridine), poly(ethylene)-poly(ethylene oxide), and poly(styrene)-poly(vinyl pyridine)-poly(ethylene oxide).

7. The method of claim 1 wherein said structure directing agent is selected from the group consisting of 8,13-bis(1-hydroxyethyl)-3,7,12,17-tetramethyl-21H,23H-porphine-2,18-dipropionic acid, 5,10,15,20-tetrakis(4-hydroxyphenyl)-21H,23H-porphine, tetra(4-carboxyphenyl)porphine (TCP), 2-(4'-hydroxybenzeneazo)benzoic acid, hydrophilic dye molecules, such as fluorescein, small protein molecules, small peptide molecules, inorganic salts, and hydrophilic nanoparticles.

8. The method of claim 7 wherein said inorganic salts have the formula $M(NO_3)_3$, where M is selected from the group consisting of Eu, Pr, Tb, Er, Tm, Ce, Fe, and $ZnNO_3$.

9. The method of claim 1 wherein said first solvent and said second solvent are selected from the group consisting of dioxane, toluene, tetrahydrofuran and dimethylfuran.

10. The method of claim 1 wherein said third solvent is selected from the group consisting of toluene, dioxane and chloroform.

11. The method of claim 1 wherein the amphiphilic block copolymer comprises a hydrophilic block copolymer and a hydrophobic block copolymer.

12. The method of claim 11 wherein said hydrophilic block copolymer should have a molecular weight sufficiently large such that micelle formation occurs.

13. The method of claim 12 wherein said hydrophilic block copolymer comprises polyvinylpyridine with a molecular weight greater than approximately 10,000.

14. The method of claim 13 wherein said molecular weight is less than approximately 30,000 to form particles with a spherical geometry.

15. The method of claim 12 wherein said hydrophilic block copolymer comprises polyvinylpyridine with a molecular weight greater than approximately 40,000 to form particles with a cylindrical geometry.

16. The method of claim 11 wherein said characteristic dimension is changed by changing the molar ratio of hydrophilic block copolymer to said hydrophobic block copolymer.

17. The method of claim 1 wherein said solution is placed on a substrate, said solution containing particles and a liquid portion, said liquid portion evaporated to form a continuous film of ordered polymer particles on said substrate.

18. A method of making hollow particles, comprising mixing at least one alcohol-soluble structure directing agent dissolved in a first solvent with at least one amphiphilic block copolymer dissolved in a second solvent to make a solution; and removing said at least one alcohol-soluble structure directing agent with an alcohol wash to form hollow particles with a characteristic diameter less than 50 nanometers.

19. The method of claim 18 wherein said alcohol-soluble structure directing agent is 2-(4'-hydroxybenzeneazo)benzoic acid.

20. A method of making particles containing an inorganic component, comprising mixing a first solution comprising a metal precursor compound selected from an Au compound, a Pt compound, a Pd compound, a Ag compound and a M$(NO_3)_3 \cdot 5H_2O$ compound dissolved in a first solvent, where M is selected from Eu, Pr, Tb, Er, Tm, Ce, Fe, and $ZnNO_3$, with a second solution of an amphiphilic block copolymer dissolved in a second solvent at an elevated temperature to make particles with a characteristic dimension of less than 50 nanometers.

* * * * *